Figure 1:
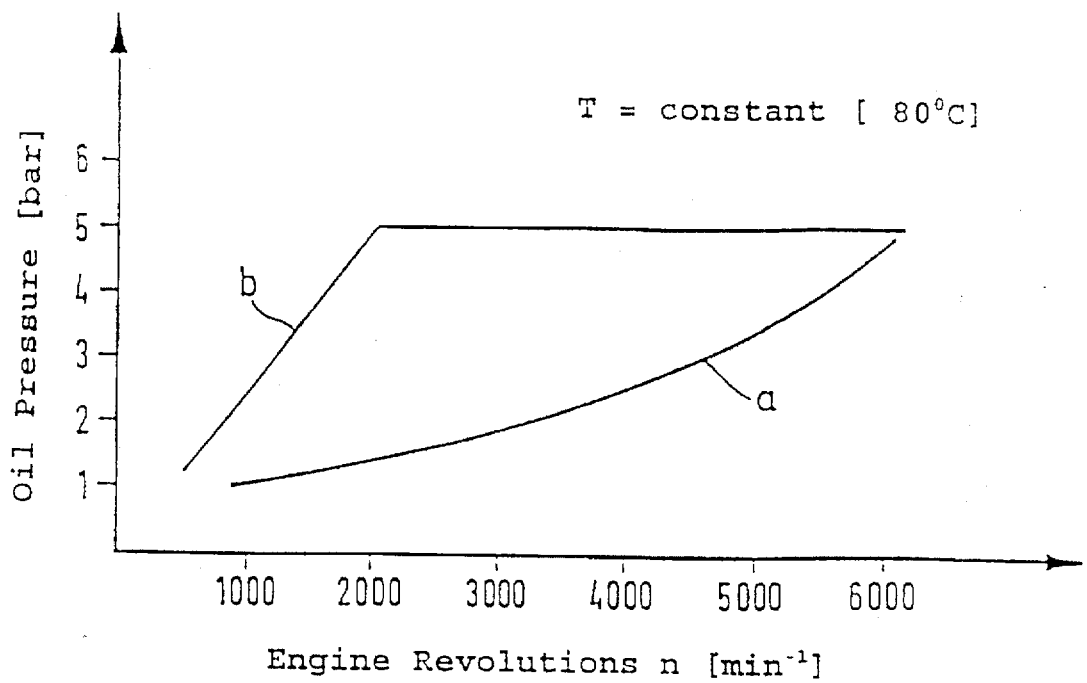

United States Patent [19]
Lehmann et al.

[11] Patent Number: 5,690,479
[45] Date of Patent: Nov. 25, 1997

[54] MULTI-STAGE REGULATOR FOR VARIABLE DISPLACEMENT PUMPS

[75] Inventors: Uwe Lehmann, Worrstandt; Bodo Stich, Wiesbaden; Maik Wilhelm, Trebur, all of Germany

[73] Assignee: Mercedes-Benz Aktiengesellschaft, Stuttgart, Germany

[21] Appl. No.: 564,346

[22] PCT Filed: Jun. 7, 1994

[86] PCT No.: PCT/DE94/00642

§ 371 Date: Apr. 23, 1996

§ 102(e) Date: Apr. 23, 1996

[87] PCT Pub. No.: WO94/29595

PCT Pub. Date: Dec. 22, 1994

[30] Foreign Application Priority Data

Jun. 9, 1993 [DE] Germany .................. 43 19 200.9

[51] Int. Cl.⁶ .................. F04C 2/344; F04C 15/04
[52] U.S. Cl. .................. 418/26; 418/27; 418/30
[58] Field of Search .................. 418/24–27, 30, 418/31; 417/213, 219, 220

[56] References Cited

U.S. PATENT DOCUMENTS

| | | | |
|---|---|---|---|
| 2,975,717 | 3/1961 | Rynders et al. | 418/26 |
| 3,415,058 | 12/1968 | Underwood et al. | |
| 4,325,215 | 4/1982 | Yamamoto | 417/220 |

FOREIGN PATENT DOCUMENTS

| | | | |
|---|---|---|---|
| 1528616 | 7/1970 | Germany | 418/30 |
| 2806965 | 8/1979 | Germany | |
| 3333647 | 5/1984 | Germany | |
| 1186360 | 4/1970 | United Kingdom | 418/30 |

*Primary Examiner*—John J. Vrablik
*Attorney, Agent, or Firm*—Paul & Paul

[57] ABSTRACT

Multi-stage regulator for lubricant pumps with continuously adjustable displaced volumes in particular for lubricant pumps, with a regulating piston to which pressure can be applied from pressure derived from the output side of the pump, and with increasing pressure can be displaced counter to the force of a flexible restoring element.

17 Claims, 6 Drawing Sheets

MULTI-STAGE REGULATOR FOR VARIABLE DISPLACEMENT PUMPS

The present invention relates to a multi-stage regulator for pumps, in particular for lubricant pumps, with a regulating piston to which pressure can be applied from pressure derived from the output side of the pump, and with increasing pressure can be displaced counter to the force of a flexible restoring element.

Such a regulator is, for example, known from regulatable vane-cell pumps. Generally in this case a piston with a circular cross-section is guided in a cylinder and pressure is applied to it by means of a branch conduit from the output side of the pump. A counter-compression spring opposes resistance to the movement of the piston in the cylinder resulting from the action of the pump pressure. A drive pin for the adjustment ring of the vane-cell pump is located, for example, between the piston and the spring. By displacement or pivoting of the adjustment ring relative to the rotor of the vane-cell pump, the eccentricity of the vane-cell pump is altered and thereby also the displaced volume of the individual cells of the pump as well as the hydraulic pumping capacity as a whole. The relative arrangement of piston, spring, rotor, adjustment ring and drive pin is in addition selected so that with rising pressure, as a result of the piston moving forward increasingly in opposition to the force of the compression spring, the adjustment ring is pressed over the drive pin, in the sense of less eccentricity relative to the rotor, so that the pumping capacity reduces and the output pressure sinks, or else is kept constant. The pump parameters which can be pre-determined, that is to say in concrete terms the geometry and size of the rotor and adjustment ring, the maximum and minimum eccentricity thereof determined by the maximum regulating distance of the piston-spring-drive pin system, and the spring characteristics, determine the properties of the regulator, that is to say above all the maximum pressure which can occur at the pump output. The speed the load connected to the output side of the pump, which represents a pressure sink with a more or less adjustable, and generally temperature dependent, flow resistance.

Such pumps are often found in internal combustion engines, which are generally used over a wide range of revolution speeds and at variable operating temperatures. In this case the pump shaft is normally directly connected to the crankshaft of the engine, and thus rotates at the same revolution speed as the engine, or at least at a revolution speed proportional thereto.

If the oil pressure produced by such a pump is plotted (at a given temperature) against the engine revolution speed, normally a more or less linear progression is found, up to a pre-determinable maximum value of, for example 5 bar, wherein above the revolution speed at which this value is reached, the pressure is kept constant with the aid of the regulator.

The oil pressure necessary for an internal combustion engine is also dependent on the revolution speed, above all because the engine has pivot bearings and rotating parts and the lubricant has in part to be conveyed radially inwards from outside, counter to the effect of centrifugal force, to rotating parts in order to guarantee sufficient lubrication of such areas. As a result there is generally a non-linear increase in the minimum necessary oil pressure with increasing revolution speed.

The development of minimum oil pressure for a typical combustion engine is shown as curve a in FIG. 1, wherein at the same time the development of the oil pressure of a lubricating oil pump with pressure control, coupled to an engine, is also shown, as curve b.

The hydraulic capacity of a pump results from the product of the volume flow produced and the pressure difference between the output and input of the pump. Regulatable lubricant pumps such as, for example, vane-cell pumps, have the property of using pressure as the regulation parameter, as the pressure acts indirectly or directly on the adjusting member which can alter the eccentricity of the piston ring, so that the amount of adjustment, that is to say that which can be altered by dealing with the parameter of pressures on the pump, is the volume flow through the pump, as by altering the eccentricity of the adjustment ring the displaced volume is altered. Because of the construction of the regulatable vane-cell pump, at least over a wide part of the available revolution speed range, the pressure at the pump output is kept constant by adapting the displaced volume. As however the flow resistance, for example in an engine, also alters depending on the operating temperature, generally the displaced volume necessary to maintain a certain pressure also alters at least depending on the temperature. Independently of the actual connection between the displaced volume and pressure, a load, for example an engine, has for a given operating condition a certain minimum lubricant requirement, and this is with respect to both the lubricant pressure and the amount of lubricant. Conventional, regulated vane-cell pumps only regulate one of these quantities, however, wherein the other quantity always adapts according to the given flow resistance. In addition, the pumps are generally set up for the maximum requirements of the engine with respect to the amount of lubricant and lubricant pressure. Therefore, with pressure control systems which are known in general for lubricant pumps and specially for vane-cell pumps, in particular in the mid-range of revolution speeds, the actual pressure delivered by the pumps and the amount of lubricant displaced is substantially greater than corresponds to the actual requirement of the load, in concrete terms the internal combustion engine. The surplus hydraulic capacity of the pumps in this respect results in their unnecessarily high consumption of operating energy. This means that despite a certain improvement compared to fixed displacement pumps, the displaced volume of which is simply partially diverted via pressure control valves, pressure controlled lubricant pumps still also do not work according to demand over wide areas.

Compared to this state of the art, the object of the present invention is to provide a regulator for regulatable lubricant pumps, wherein the simplest possible design makes possible a qualitative improvement to the regulation characteristics, which better corresponds to the actual requirements of the engine with respect to pressure and displaced volume of lubricant, and consequently operates largely without losses, that is to say without surplus hydraulic capacity.

This object is solved in that the regulating piston is composed of a plurality of part pistons to which pressure from the system can be applied simultaneously, which are moveable over a limited regulating distance in a parallel manner, wherein a stop is provided for at least one of the part pistons, which limits its regulating distance counter to the direction of force of the restoring element when there is increasing pump output pressure, wherein at least one further part piston remains moveable counter to the force of the restoring element.

As long as the part pistons of which the regulating piston according to the invention is composed move parallel as a common unit, such a regulator has the same qualitative pressure development as the regulator described in the introduction for conventional, regulatable vane-cell pumps. That is to say, while with very low revolution speeds the initial pressure of the pump rises relatively steeply at first with increasing revolution speed, without the control mechanism being actuated to any substantial extent, the part pistons, to which output pressure from the pump is applied, then move counter to the force of a restoring element, that is to say in general a compression spring, and thereby reduce the displaced volume of the pumps and consequently also their hydraulic capacity. With this, in general a more or less constant pressure occurs over a larger revolution speed range. Only when the revolution speed rises further and as a result there is a further displacement of the part pistons, one of these part pistons makes contact with a stop and its further regulating distance is limited, and the force from the part piston or part pistons which is still exerted against the restoring element is not sufficient to effect a further displacement of this part piston counter to the force of the restoring element, due to the smaller surface of the part piston or part pistons respectively, which are still moveable and upon which the control pressure acts. As the displaced volume then also rises with increasing revolution speed, the output pressure of the pump also increases until a second limit pressure is reached, at which point the force on the part piston or part pistons still moveable is sufficient for them to move counter to the force of the restoring element and thereby move a pusher, an adjusting member or another element of the pump by means of which the displaced volume thereof, and thereby also the output pressure, is limited at a higher level compared to the first limit pressure.

Figure 2:
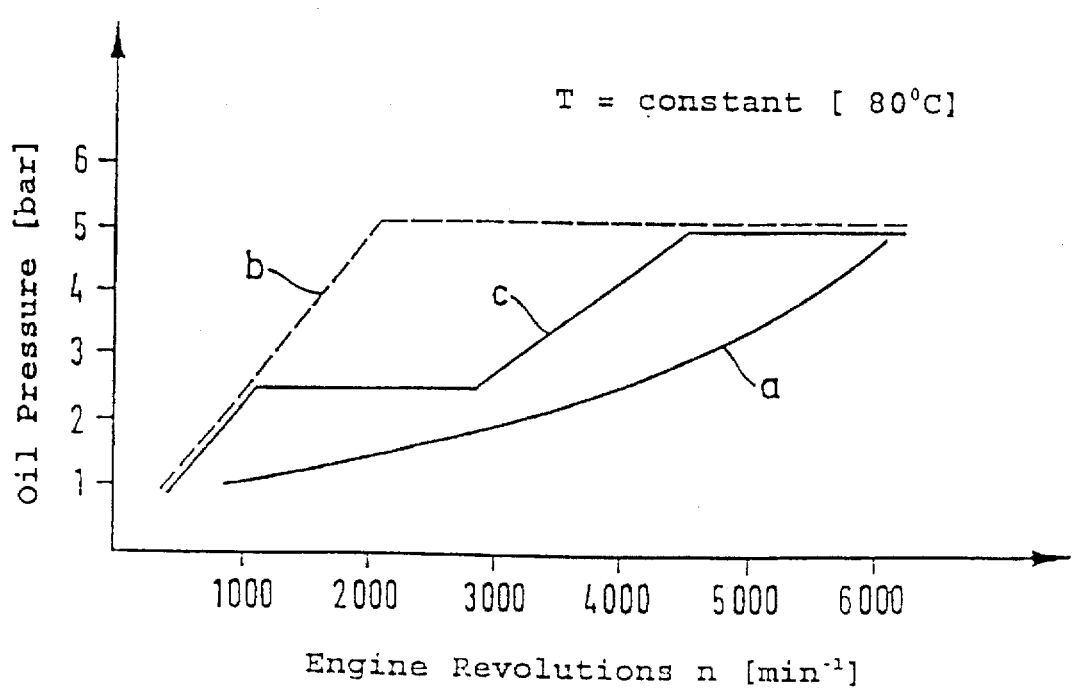

The qualitative development of the resulting pressure curve over the revolution speed is shown as curve c in FIG. 2, wherein in FIG. 2 the development of curve b according to FIG. 1 is also shown again in dashed lines. As can be seen, curve c is substantially better "adapted" to curve a than is curve b and the pump above all displaces the oil, within an average revolution speed range, at a lower pressure and thereby also in smaller amounts (FIG. 3) which leads to a corresponding reduction in the operating power needed for the pump.

In the preferred embodiment of the invention, a first part piston is an outer ring piston, while a second part piston is an inner central piston. This means the inner central piston is moveable within the outer ring piston, wherein advantageously the movement is limited in at least one direction, so that both part pistons move as one unit during corresponding operating conditions.

Advantageously, the central piston engages with a compression spring, serving as a restoring element, while the ring piston is provided with a catch by means of which the central piston is carried along counter to the force of the compression spring when a corresponding pressure acts upon the pistons, so that the forces of the central piston and the ring piston acting upon the compression spring are cumulative in total. In a preferred embodiment of the invention, the catch is provided in the form of a groove on the inside of the retaining ring embedded in the central piston.

The outer ring piston and the inner central piston can be provided with essentially independent guides such as, for example, guide bushes and the like, however an embodiment of the invention is preferred in which the ring piston serves as the guide sleeve or cylinder for the central piston, so that in this way the external diameter of the central piston is approximately equal to the internal diameter of the ring piston and both pistons slide-fit tightly one within the other.

A concrete embodiment of the invention additionally provides that a guide cylinder is provided with a first cylindrical space for the guidance of the ring piston, so that in this way this cylindrical space has an internal diameter which corresponds approximately to the external diameter of the ring piston, whereby this first cylindrical space narrows in a step-wise manner and in this way adjoins a second cylindrical space, the internal diameter of which is at least as large as the external diameter of the central piston, wherein advantageously the axes of the central piston, ring piston, and the two cylindrical spaces of the guide cylinder should also be aligned with one another. It is not necessary, however, for the second cylindrical space to form a guide for the central piston, at least not when it is already tightly inserted in the ring piston.

In this embodiment the step-wise narrowing of the first cylindrical space with respect to the second cylindrical space acts as a stop for the ring piston, while with a suitable application of pressure, the central piston can move further into the second cylindrical space counter to the effect of a compression spring, wherein said space does not necessarily have to be cylindrical.

The multi-stage regulator according to the invention can naturally also be provided with additional ring pistons between the (outer) ring piston and the central piston, which successively engage, following the outer piston, with respectively assigned stops, and the central piston can for its part also be configured as a hollow cylinder.

An embodiment of the invention is particularly preferred in which the stop for at least one part piston, preferably for the ring piston described, is variable, and is preferably variable dependent upon the temperature, such that at lower temperatures a greater regulating distance is available for the part pistons being stopped than at higher temperatures.

With a fixed stop and when the lubricant is at a low temperature, a higher pressure builds up at relatively low revolution speeds, which means that the first part piston comes to a stop relatively early and as a result the displaced volume or the displacement pressure increases prematurely from the first pressure control limit to the higher level at relatively low revolution speeds. On the other hand with a variable stop, it is possible to delay the stopping time, above all at low lubricant temperatures, or respectively to adjust it at excessively high revolution speeds.

It is naturally also possible to configure the multi-stage regulator according to the invention not only in the form of ring pistons packed one inside another, but instead corresponding pistons can be arranged adjacently, wherein initially they exert a force in common upon the adjustment ring and after a pre-determinable regulating distance one or more of the pistons comes into contact with a stop.

Figure 3:
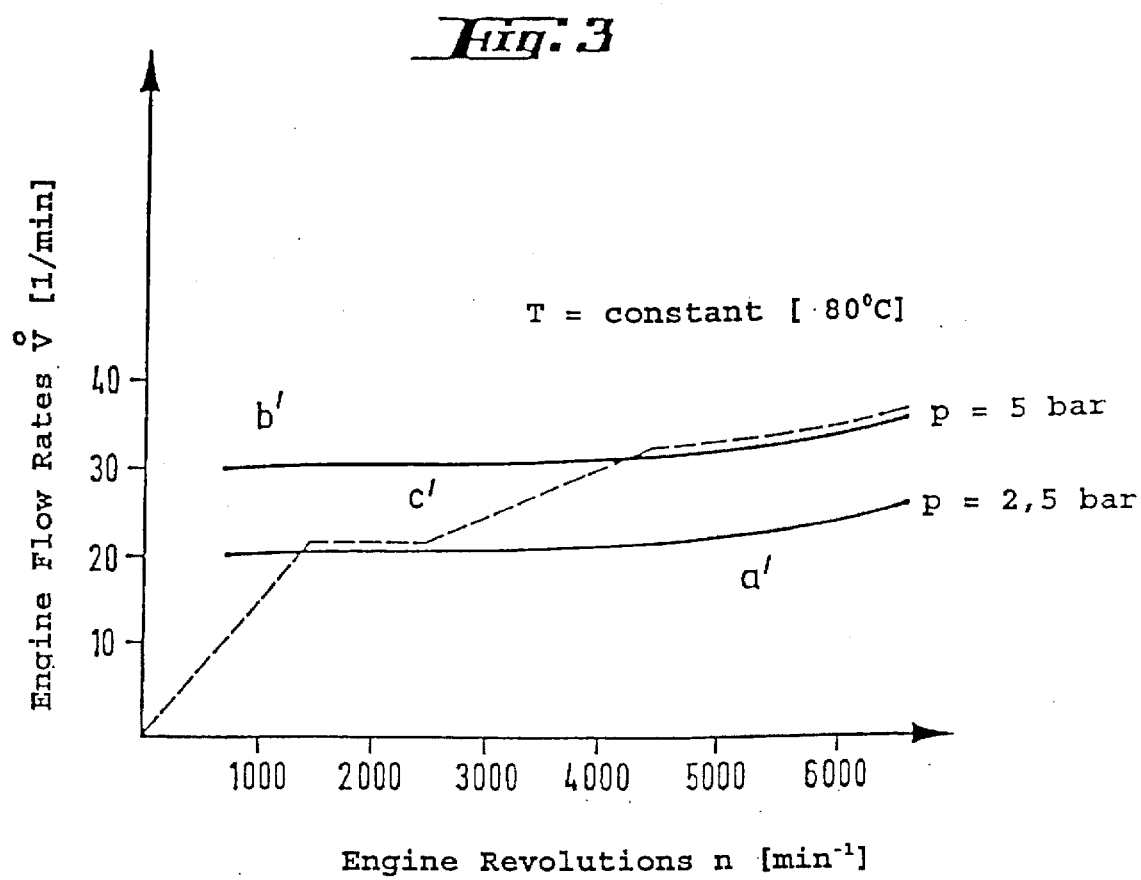
Figure 4:
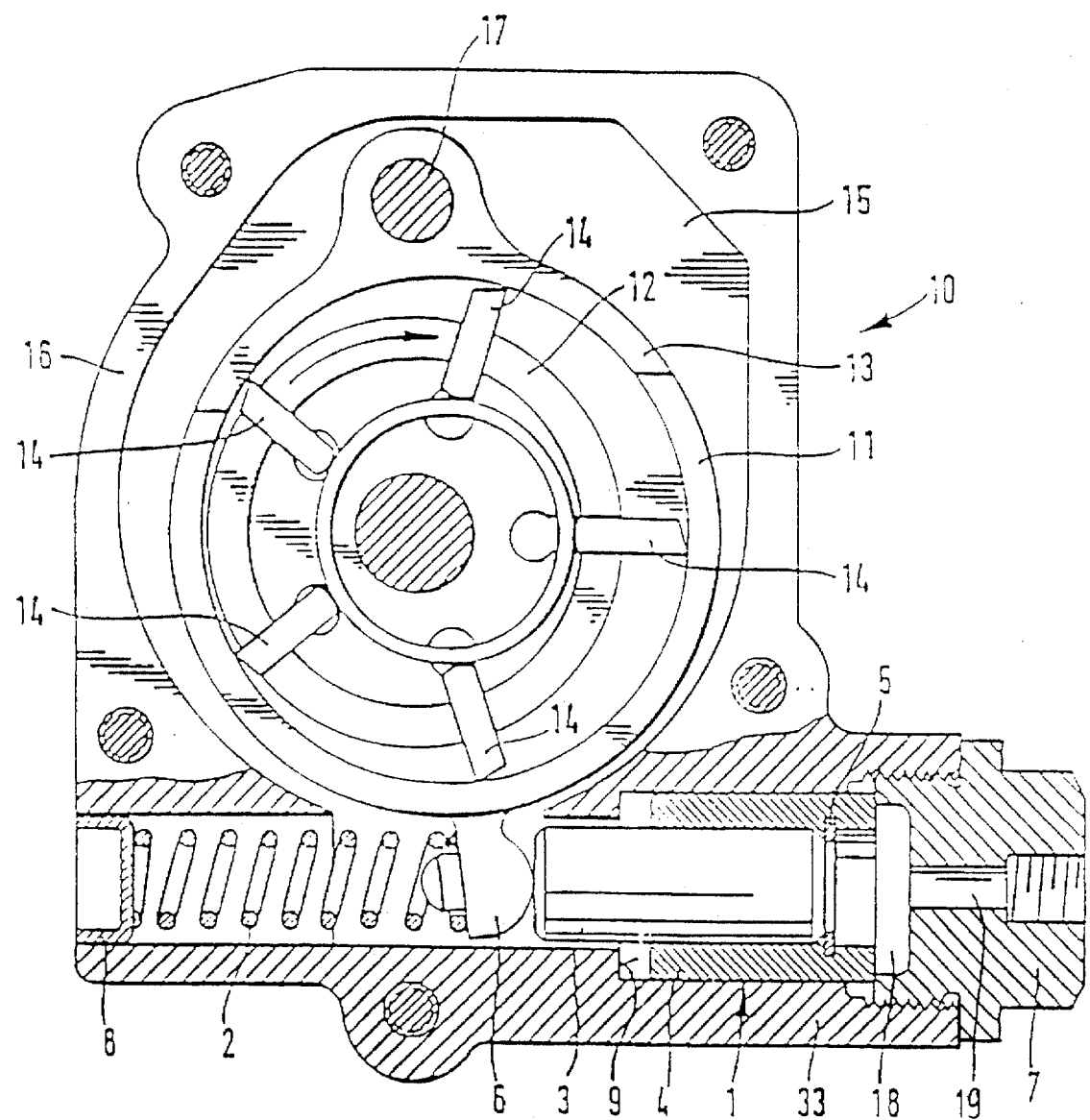
Figure 5:
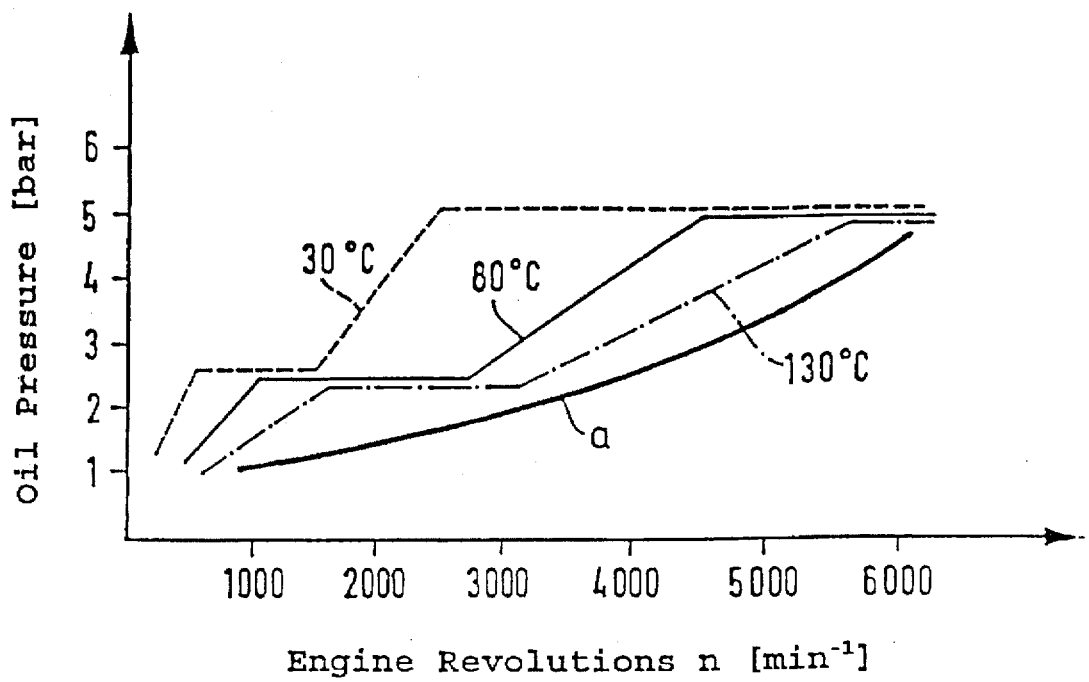
Figure 6:
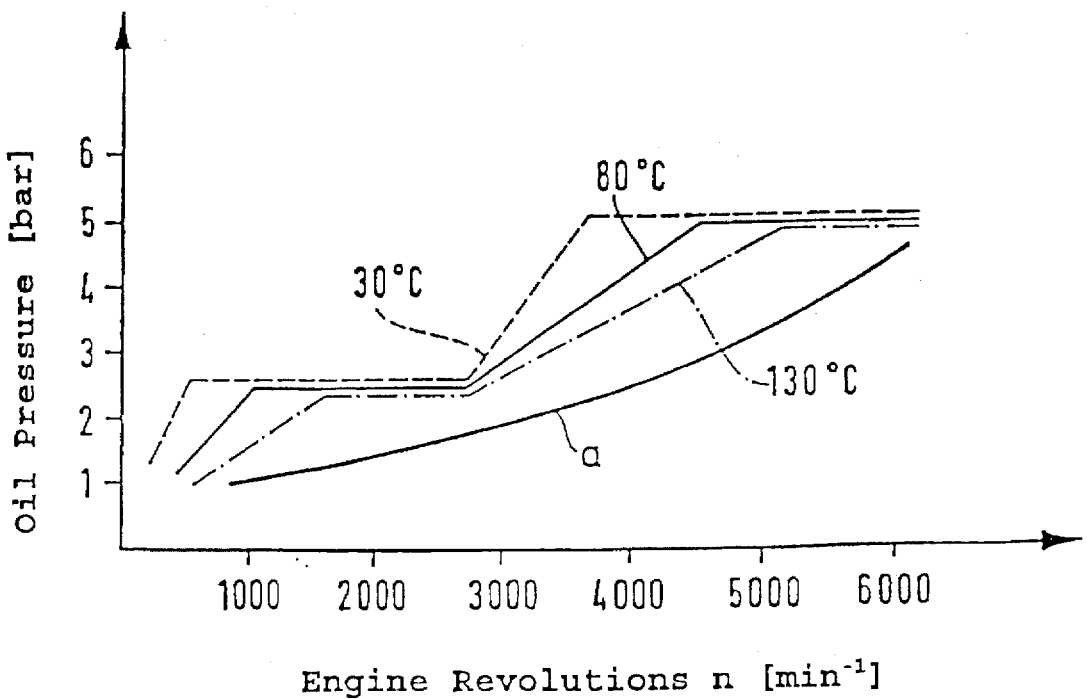
Figure 7:
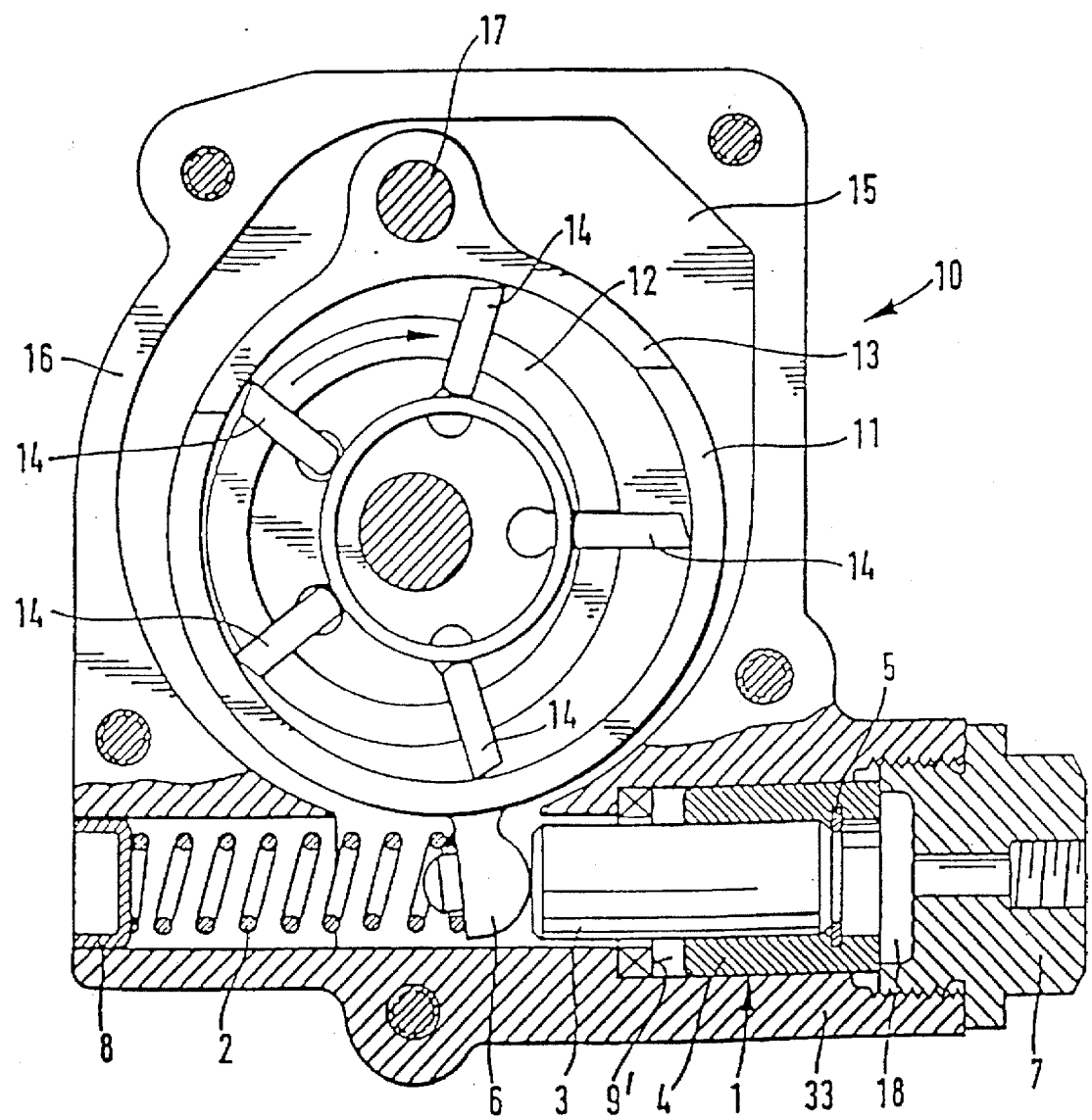

Further advantages, features and possibilities for application of the present invention will be made clear by the following description of a preferred embodiment, and the drawings with reference thereto. There is shown:

FIG. 1 the development of pressure over engine speed with a conventional regulated vane-cell pump, and a typical minimum oil pressure for an engine, depending on the revolution speed, FIG. 2 a representation of oil pressure curves corresponding to FIG. 1, wherein additionally the regulation characteristic for the pressure controller according to the invention is shown, FIG. 3 the mass rate of flow of the engine, resulting from curve c according to FIG. 2, depending on the revolution speed for different constant and variable pressures, FIG. 4 a section through a vane-cell pump with the pressure control apparatus according to the invention, FIG. 5 the regulation characteristic of a multi-stage regulator with a fixed stop, at different temperatures, FIG. 6 a regulation characteristic of the multi-stage regulator according to the invention, optimised by a temperature-dependent variable stop, and FIG. 7 the regulating part of a vane-cell pump with a variable stop.

Figure 8:
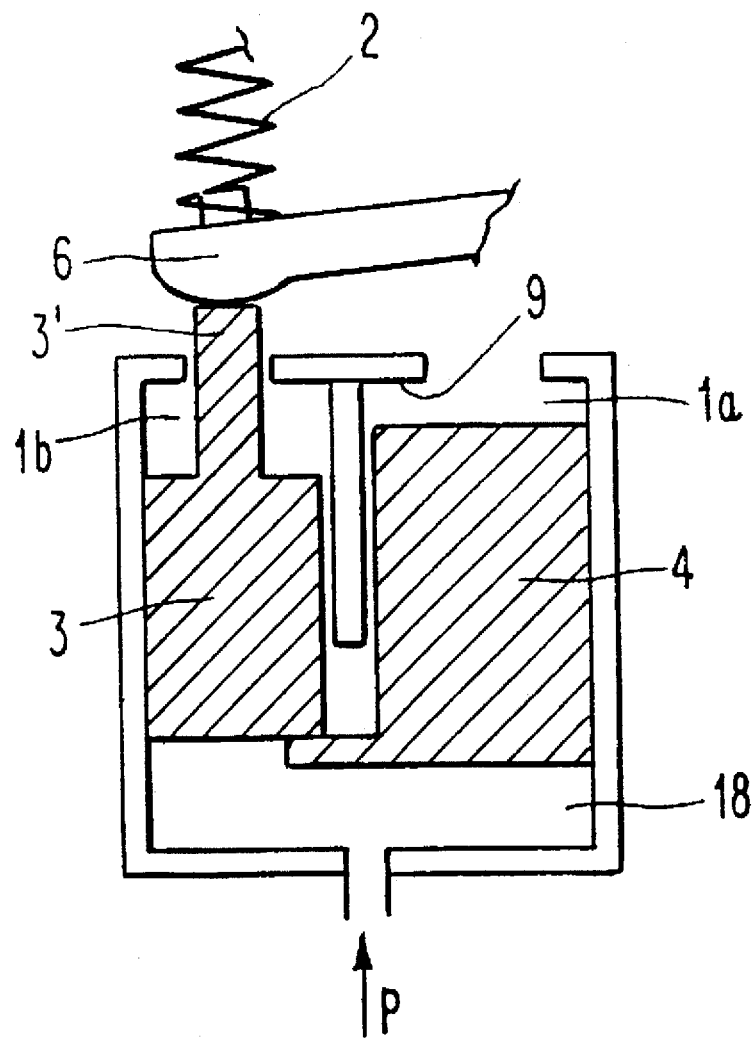

FIG. 8 is a sectional view of an alternate embodiment of a multi-stage regulator according to the invention wherein pistons are arranged adjacently.

FIG. 1 shows the development of two oil pressure curves a and b, for an internal combustion engine, over engine speed. With this, curve a shows the minimum oil pressure required by the engine at the respective revolution speed for maintaining a reliable lubrication of all the engine parts, while curve b shows the development of pressure which is actually produced by a regulated lubricant pump, in concrete terms a regulated vane-cell pump. In this case, the steepness of the initial rise in curve b is also dependent on the current operating temperature, and respectively from the flow resistance of the oil consuming points and incoming supplies. The disproportional rise in curve a with increasing revolution speed is connected to the fact that bearings and other rotating parts have to be supplied from the outside with lubricant and that with this the lubricant or oil has partly to be pressed radially inwards counter to the effect of centrifugal force, wherein the centrifugal force increases in a quadratic manner with the revolution speed.

The development of curve b results above all from the fact that the displaced volume of a vane-cell pump is approximately proportional to the revolution speed, so that with constant flow resistance the pressure firstly rises relatively fast with increasing revolution speed, and at the same time, however, the regulating mechanism, composed of a piston and a spring, downwardly regulates the displaced volume and then limits it such that a substantially constant output pressure occurs above a certain revolution speed. This constant output pressure must, however, correspond at least to the pressure which is required by the engine at the highest possible revolution speed and the highest operating temperature.

As, on the other hand, the maximum displaced volume geometry of a lubricant pump has to be set up with respect to the two most critical points of operation, namely the minimum revolution speed and the maximum operating temperature, in general the maximum output pressure is reached at far below the highest revolution speed, even with hot engine oil.

FIG. 1 shows that in particular in the mid-range of revolution speeds, the pressure produced by the pump is substantially greater than the minimum oil pressure required by the engine. At the same time, because of this higher pressure a larger amount of oil is drawn, wherein the hydraulic pump capacity is proportional to the product of pressure and amount of oil drawn per unit time. If therefore the pressure and amount of oil drawn are respectively double that of an oil pressure set up for the minimum requirement, the hydraulic capacity required for this is four times the minimum capacity required.

It is also shown that from the point of view of a lower power consumption by the pump, and consequently also a reduction in the energy consumption of the engine it would be advantageous, particularly in the mid-range of revolution speeds, to approximate the oil pressure produced by the pump to the minimum oil pressure required for the engine. This is done with a regulator according to the present invention which, represented in this case by two two-stage controls, produces a pressure development as shown qualitatively in FIG. 2 by curve c. For better comparison, a curve b, corresponding to the curve b in –FIG. 1, is also shown in dashed lines in FIG. 2.

FIG. 2 shows that particularly in the range in which the distance apart between the curves a and b is greatest, and consequently the pump is producing a particularly excessive amount of hydraulic pump capacity, and consuming a corresponding amount of driving power, the pressure development according to curve c decreases significantly and the curve a is very much closer, so that the pump also consumes correspondingly less power when its output pressure is set up according to curve c.

In FIG. 3, the mass rates of flow of lubricant are plotted over engine speed in several curves. Curves a' and b' respectively show the mass rates of flow of the engine, which are obtained when the pressure is always kept at a constant value of 2.5 bar or 5 bar respectively (which corresponds to the limit pressures of curve c in FIG. 2). As can be seen from FIG. 2, these are approximately the two pressure stages at which the pressure regulator according to the invention keeps the output pressure according to curve c of a vane pump constant over a certain range of revolution speeds. The actual mass flow rate of the engine when the pressure is regulated according to curve c in FIG. 2 is then shown in the form of curve c' in FIG. 3. It is clear that the mass flow rate development in the ranges where the pressure is kept constant also follows the isobars in FIG. 3. However, it can also be seen from FIG. 2 that a constant pressure of 2.5 bar would not be sufficient to reliably lubricate the engine at high revolution speeds, so that the change-over to a higher pressure and to a higher mass flow rate is necessary and, according to curves c and c' in FIGS. 2 and 3, also occurs.

The development of curves c and c' in FIGS. 2 and 3 is obtained by a vane-cell pump with a pressure regulator, shown by way of example, as represented schematically in FIG. 4.

FIG. 4 shows a vane-cell pump 10 with a housing 16, a rotor 12, vanes 14 driven by the rotor and an adjustment ring 11. The adjustment ring 11 has radial inlet apertures 13, through which the cell volume formed between the vanes 14 and the adjustment ring 11, which, with the direction of rotation shown, increases in the upper part of the adjustment ring in the direction of rotation, sucks in oil from the suction space 15. In the lower part of the adjustment ring where the cell volume increasingly reduces in the direction of rotation, the oil is pressed out through output apertures which are not shown, or are not visible. The displaced volume per rotation of the rotor is dependent on the difference in the changes in volume of the individual cells in the top and the bottom area of the adjustment ring, which again are determined by the eccentricity of the adjustment ring 11 with respect to the rotor 12. The adjustment ring 11 is pivotably mounted and is provided on its lower end, distanced from the swing shaft 17, with an adjustment pin 6, which engages on the one hand with a regulating piston 1 and on the other hand with a compression spring 2. The compression spring 2 is contained in a recess in the housing 16, and is supported by an embedded sleeve 8. The regulating piston 1 is composed of a central piston 3 which engages with the pin 6, and consequently acts directly counter to the force of the spring 2, and a ring piston 4, closely guiding the central piston 3. The ring piston 4 and the central piston 3 are also contained in a recess in the housing 16, wherein the ring piston 4 is guided in a pressure sealed but slidable manner in the recess in the housing which contains it. An end stopper 7 retains the piston 1 in the housing 16 and at the same time produces a pressure supply aperture 19 from which the output pressure is applied to the central piston 3 and the ring piston 4. The output pressure or system pressure p, produced by the pump, thus prevails in the space 18 between the stopper 7 and the regulating piston 1. This acts on both the end face of the central piston 3 and the end face of the ring piston 4. In the internal wall of the ring piston 4, a continuous groove is provided in which a sealing ring 5 is contained, which ensures that when the ring piston 4 moves to the left according to FIG. 4, it collides with the retaining ring on the end face of the central piston 3, and is obliged to carry said piston along for as far as the force of opposition exerted by the spring 2 allows. As long as the retaining ring 5 of the ring piston 4 is non-positively engaged with the end face of the central piston 3, the two part pistons 3, 4 act as a unitary piston which presses against the pin 6 and thereby against the compression spring 2 with a force which corresponds to the product of the prevailing pressure multiplied by the total end surface of the two part pistons 3, 4.

As the displaced volume of the pump reacts relatively sensitively to small adjustments to the adjustment ring 11 or respectively to the regulating pin 6, a regulating mechanism is obtained which produces a substantially constant pressure depending on the piston surface of the pistons 3, 4 and the spring constants of the compression spring 2 over a certain range of revolution speeds of the pump, which, according to FIG. 2, can be approximately 2.5 bar. With increasing revolution speed, however, the front end face of the ring piston 4 then reaches a stop 9, which is formed by a step-wise transition of the cylindrical guide space for the ring piston 4 to a cylindrical space with a smaller diameter in which the central piston 3 can still move with clearance. If the revolution speed now increases further, and with this the pressure, the ring piston 4 can no longer participate in a displacement of the adjusting pin 6, as the force of pressure acting on its right-hand end face is captured by the stop 9 and can no longer be transferred to the central piston 3. With increasing revolution speed, at this stage the pressure will further increase until at last the force of pressure acting solely on the end face of the central piston 3 is sufficient to overcome the opposing force of the spring 2, whereupon the pressure is again regulated to a substantially constant level, albeit now at a higher level of approximately 5 bar (see FIG. 2).

FIG. 5 shows curve c according to FIG. 2, for three different temperatures of the lubricant, that is for 30° C., 80° C. and 130° C. The curves are preferably to be interpreted as follows, with reference to the control mechanism in FIGS. 4 and 7 respectively. In the case of the curve shown by a dashed line, for a lubricant temperature of approximately 30° C., at very low revolution speeds there is firstly a continuous increase in the oil pressure until the regulator actually starts operating. With increasing revolution speed, the displaced volume and pressure increase, so that with a pressure of approximately 2.5 bar, the control mechanism begins to operate, in that both pistons move the piston ring 11 counter to the action of a restoring element such as the spring 2 in FIG. 4, and thereby keep the pressure constant. Finally, the outer ring piston collides with the stop 9, so that the force now acting solely on the part piston 3 is insufficient to further compress the spring 2. In this way, the regulator is firstly inactive again, so that the pressure and volume flow can again increase with the revolution speed, which is shown diagrammatically in FIG. 5 by the increase from 2.5 bar to 5 bar. The moment of contact of the ring piston 4 with the stop 9 is thus characterised by the kink in the curve of oil pressure over the engine speed at the end of the 2.5 bar level. When the pressure of 5 bar is reached, the force acting upon the part piston 3 is then also sufficient to push the adjustment ring 11 counter to the action of the spring 2, so that the pressure is then kept at the constant level of 5 bar up to the maximum revolution speed.

At higher temperatures, the lubricant flows more easily through the lines and other flow resistors, such as friction bearings, the result of which is that the development of the oil pressure over the revolution speed is qualitatively equal, however in quantitative terms indicates a less steep increase and a displacement of the change-over point to the higher speed of revolutions. This means that the two part pistons first start to move at a higher revolution speed, namely when an intermediate level of 2.5 bar is reached and keep the pressure substantially constant because of their inward movement until the outer ring piston 4 again collides with the stop 9 and a renewed increase in pressure to approximately 5 bar occurs. As shown in FIG. 5, the development of the curves at 30° C. and 130° C. is increasingly less steep, and the change-over point, and also in particular the stopping of the outer ring piston 4 on the corresponding stop 9, is displaced to higher revolution speeds with rising temperature. By means of a temperature-dependent stop, it is however possible that at least the stop of the outer ring piston also moves at low temperatures to lead to higher revolution speeds, that is to say gets nearer to an ideal curve or respectively a curve engine requirements. This development is shown in FIG. 6 and is produced by a temperature-dependent stop 9' as shown in a regulator according to FIG. 7. The temperature-dependent stop 9' can, for example, be an expansion element, such as fitted in thermostatic valves, wherein a special adjustment has to take place for the new purpose, but the principle of operation is however essentially the same. In concrete terms, the temperature-dependent stop 9' operates so that at lower temperatures the stopping point for the part piston 4 moves to the left, in other words the expansion elements shrinks or contracts. In this way, at lower lubricant temperatures, which because of close contact also determine the temperature of the expansion element, that is to say the temperature-dependent stop 9', the part piston 4 has a greater available regulating distance, which in concrete terms means that the second change-over point, that is to say the contact of the part piston 4 on the stop 9', takes place at a higher revolution speed compared to FIG. 5. With increasing temperature, the expansion element expands and the stop 9' is moved further to the right and thereby shortens the available regulating distance for the part piston 4. In this way, in contrast to FIG. 5, the beginning of the increase from the 2.5 bar level to the 5 bar level no longer moves at higher revolution speeds, despite the decreasing flow resistance in the system, or in other words, at low temperatures this change-over point has already been moved so close to the requirements curve that with increased temperature, a further movement of this point nearer to curve a is not desired. In this way the relatively advantageous case shown in FIG. 6, wherein the stopping of the outer ring piston 4 is largely independent of the temperature, can be obtained, that is to say it always takes place at approximately the same revolution speed at any temperature. It can be seen that compared to FIG. 5, in this way a still more advantageous approximation to the requirements of the engine according to curve a is obtained even at lower temperatures, while the development at high temperatures remains substantially unaffected.

FIG. 8 shows an alternate embodiment wherein two separate pistons, a first piston 3 and a second piston 4, are movable in two parallel, cylindrical bores 1a, 1b which extend from a common pressure chamber 18. The second piston 4 is provided with a lower lateral extension engaging the bottom of the first piston 3 while the first piston 3, on the opposite end thereof, is acting against an adjustment pin 6 which in turn is urged to the opposite direction by a helical spring 2. A stop 9 is provided for the second piston 4 and it may easily be recognized that upon increasing pressure, both first and second pistons 3, 4 will be moved together against the action of the spring 2 until the second piston 4 reaches the stop 9, whereupon also the movement of the first piston 3 is stopped because the force exerted by the first piston 3 alone may not be sufficient to overcome the counteracting force of helical spring 2. However, once pressure P is further increased by a sufficient amount, the first piston 3 again starts to move against the action of the spring 2 (possibly until a final stop is reached for the first piston 3, too). The resulting oil pressure curves and curves and engine flow rates, each versus the engine revolutions in a corresponding lubrication system, will then be the curves c and c' as shown in FIGS. 2 and 3, respectively, just as for the concentrical pistons shown in FIGS. 4 and 7.

We claim:

1. Multi-stage regulator for a variable displacement volume pump with a pressure regulating piston to which a pressure (P) derived from the output side of a said variable displacement volume pump can be applied, and which upon increasing pressure can be displaced counter to the force of a flexible restoring element, said regulator comprising a regulating piston having a plurality of part pistons, including at least a first part piston and a second part piston, to which pressure can be simultaneously supplied, said part pistons being engagable with each other such that they can be moved simultaneously over a limited regulating distance in a parallel manner, wherein for at least said second part piston of said plurality of part pistons a stop is provided which limits the regulating distance of said second part piston in opposition to the direction of force of said restoring element as the pressure increases, wherein said first part piston of said plurality of part pistons still remains movable counter to the force of the restoring element, wherein said first and second part pistons have transferring means therebetween such that the force acting on said second part piston when being in engagement with said first part piston is transferred to said first piston via said second part piston.

2. Multi-stage regulator according to claim 1, wherein the part pistons are parallel pistons which are not packed on another.

3. Multi-stage regulator according to claim 1, wherein said first part piston comprises an inner central piston and wherein said second part piston comprises an outer ring piston.

4. Multi-stage regulator according to claim 3, wherein the central piston engages with the restoring element wherein said restoring element comprises a compression spring, and wherein the ring piston is provided with said transferring means comprising a catch for carrying along the central piston.

5. Multi-stage regulator according to claim 4, wherein said catch comprises a locking ring.

6. Multi-stage regulator according to any one of claims 3 or 4, wherein the external diameter of the central piston is approximately the same as the internal diameter of the ring piston, so that the central piston can be received in a tight sliding fit in the ring piston.

7. Multi-stage regulator according to any one of claims 3 or 4, further comprising a guide cylinder having a first cylinder space, the internal diameter of which corresponds approximately to the external diameter of the ring piston, wherein adjoining by means of a step-wise narrowing of the first cylindrical space is a second cylindrical space, the internal diameter of which corresponds to the external diameter of the central piston, wherein the transitional step between the cylindrical spaces forms a stop for the ring piston.

8. Multi-stage regulator according to any one of claims 3, 4 or 1, wherein the stop is adjustable.

9. Multi-stage regulator according to claim 8, wherein the stop is automatically adjustable dependent upon the temperature.

10. Multi-stage regulator according to claim 9, wherein the direction of adjustment is selected so that at lower temperatures, a greater regulating distance is produced for the part piston being stopped.

11. Multi-stage regulator for a variable displacement volume pump with a pressure regulating piston to which a pressure (P) derived from the output side of a said variable displacement volume pump can be applied, and which upon increasing pressure can be displaced counter to the force of a flexible restoring element, said regulator comprising a regulating piston having a plurality of part pistons, including at least a first part piston and a second part piston, to which pressure can be simultaneously supplied, said part pistons being engagable with each other such that they can be moved simultaneously over a limited regulating distance in a parallel manner, wherein for at least said second part piston of said plurality of part pistons a stop is provided which limits the regulating distance of said second part piston in opposition to the direction of force of said restoring element as the pressure increases, wherein said first part piston of said plurality of part pistons still remains movable counter to the force of the restoring element; wherein said first part piston comprises an inner central piston and wherein said second part piston comprises an outer ring piston.

12. Multi-stage regulator according to claim 11, wherein the central piston engages with the restoring element, wherein said restoring element comprises a compression spring, and wherein the ring piston is provided with a catch for carrying along the central piston.

13. Multi-stage regulator according to any one of claims 11 or 12, wherein the external diameter of the central piston is approximately the same as the internal diameter of the ring piston, so that the central piston can be received in a tight sliding fit in the ring piston.

14. Multi-stage regulator according to any one of claims 11 or 12, further comprising a guide cylinder having a first cylinder space, the internal diameter of which corresponds approximately to the external diameter of the ring piston, wherein adjoining by means of a step-wise narrowing of the first cylindrical space is a second cylindrical space, the internal diameter of which corresponds to the external diameter of the central piston, wherein the transitional step between the cylindrical spaces forms a stop for the ring piston.

15. Multi-stage regulator according to claim 12, wherein the stop is adjustable.

16. Multi-stage regulator according to claim 15, wherein the stop is automatically adjustable dependent upon the temperature.

17. Multi-stage regulator according to claim 16, wherein the direction of adjustment is selected so that at lower temperatures, a greater regulating distance is produced for the part piston being stopped.

* * * * *